Feb. 6, 1968     C. R. WILLIAMS     3,367,230
LIGHT DENSITY SCANNING DEVICE
Filed Dec. 4, 1963     3 Sheets-Sheet 1
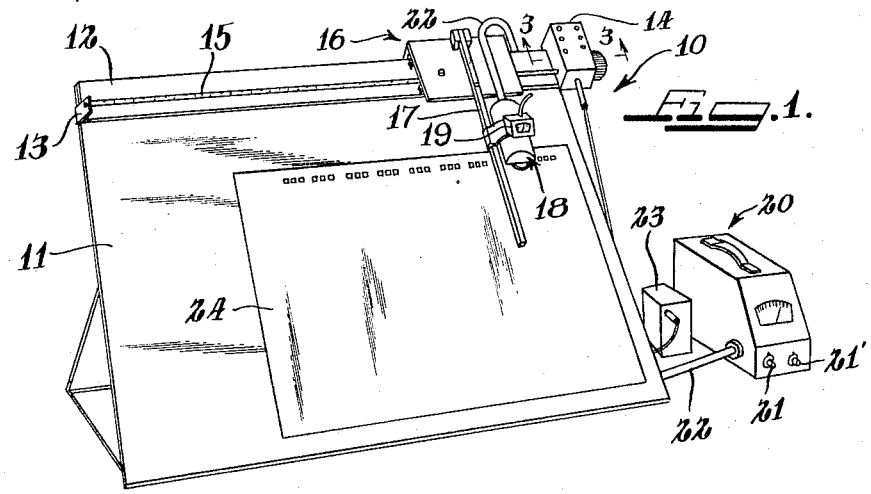
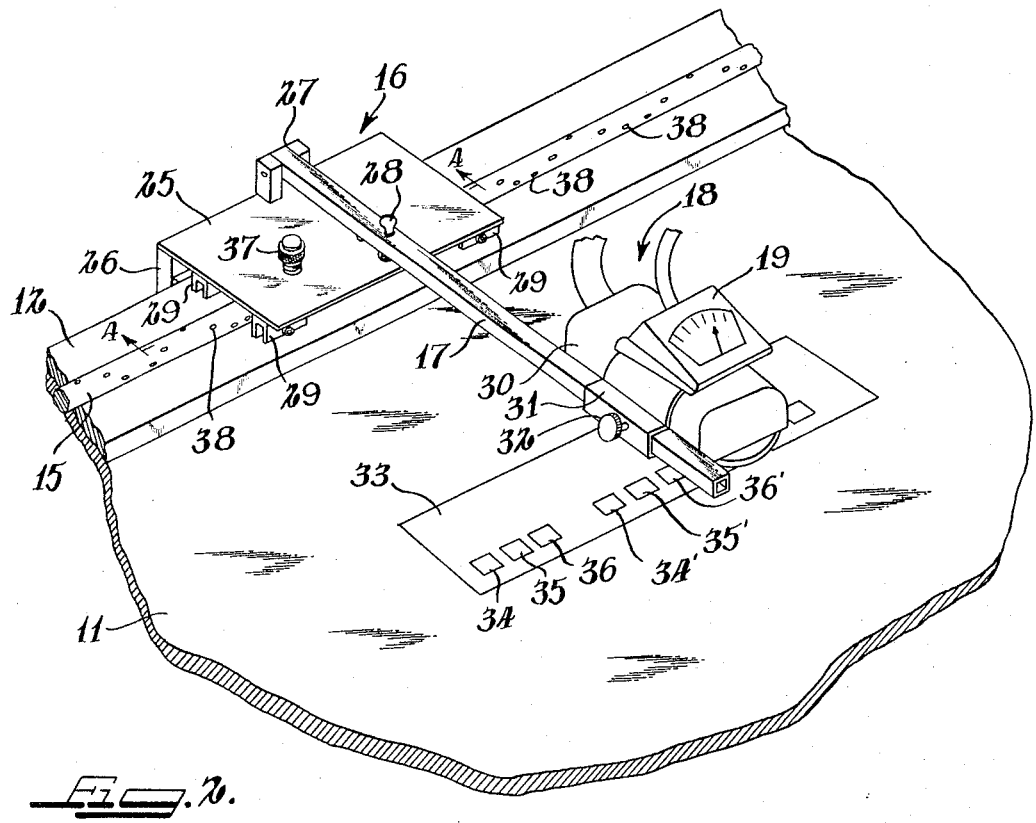
INVENTOR.
CHARLES R. WILLIAMS
BY
Greist, Lockwood, Greenawalt & Dewey
Attys.

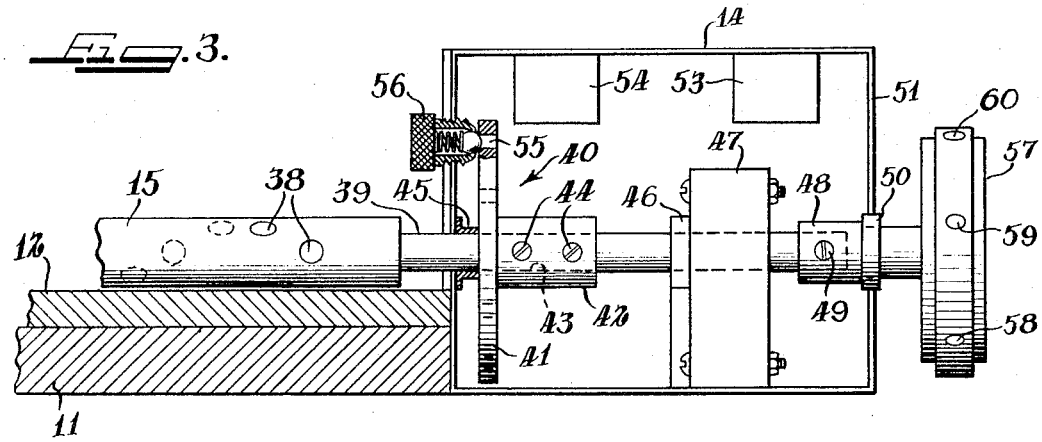
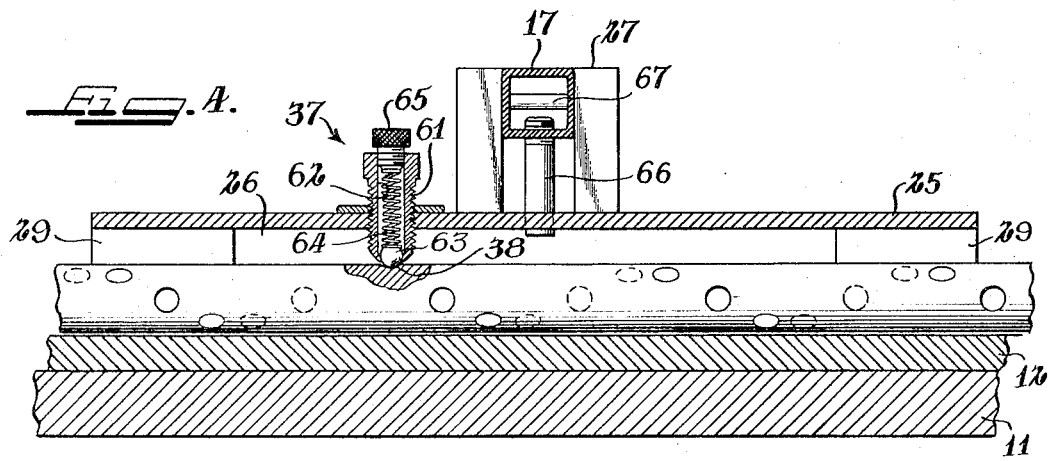
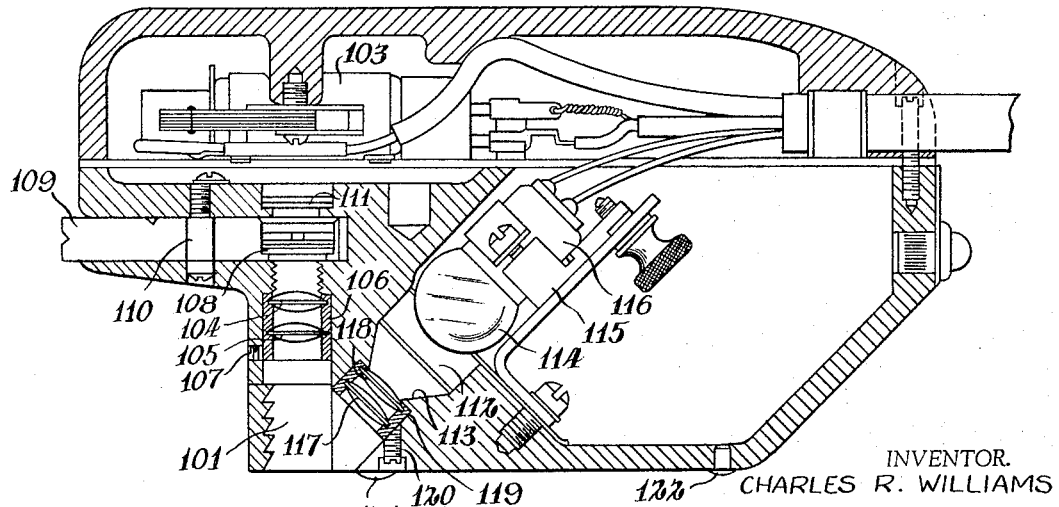

Feb. 6, 1968          C. R. WILLIAMS          3,367,230
LIGHT DENSITY SCANNING DEVICE
Filed Dec. 4, 1963                3 Sheets-Sheet 3

INVENTOR.
CHARLES R. WILLIAMS
BY
Greist, Lockwood, Greenawalt & Dewey
Attys.

United States Patent Office 3,367,230
Patented Feb. 6, 1968

3,367,230
LIGHT DENSITY SCANNING DEVICE
Charles R. Williams, Wheaton, Ill., assignor to The Welch Scientific Company, Chicago, Ill., a corporation of Illinois
Filed Dec. 4, 1963, Ser. No. 327,905
11 Claims. (Cl. 88—14)

ABSTRACT OF THE DISCLOSURE

A light density scanner assembly for monitoring color density in printing. A memory control automatically assures proper attenuation of the amplifier simultaneously with selection of reflector head alignment for rapid scanning. Direct reading of the test results at the test surface is also available.

---

This invention relates to a new and improved form of light density scanning assembly particularly adapted to facilitate expedient monitoring of colors in printing operations in order to accurately measure the ink density or ink film thickness. More specifically, the present invention is directed to a positioning device which promotes rapid scanning of a reflector head over a color test strip, with memory control means provided to insure precise alignment of the reflector head over each of the test color patches as well as automatically providing proper attenuation for each of the respective test colors to improve accuracy in the readings taken. Additional means is provided to permit direct reading of the test results at the work surface rather than at a remote location as was done in the past.

Color monitoring in the printing and associated fields is an absolute must if the supplier is to deliver the better product at a lower cost. The keen competition in the industry demands increasingly higher quality at reduced costs and only those suppliers who are properly equipped to meet these demands will remain competitive. In the past, color control was maintained by a visual comparison at regular intervals of a standard or "pass copy" with the product being printed. Changes in spectral values of ink tones, especially in the yellows, are not sufficiently noticeable by the human eye even to those with a high level of skill and experience in recognizing minute changes in color. To remedy the obvious inaccuracies encountered in this mode of operation, various methods and means of a more sophisticated nature were devised to measure the ink density, which at first blush, were seemingly satisfactory when compared with the rather crude predecessor methods. However, these methods and apparatus used in testing were not without shortcomings and disadvantages also, as higher standards of quality and more expediency in obtaining test results were required in order to further reduce costs by timely effecting proper adjustment. In addition, cost considerations severely limited the use of such methods and apparatus to those whose operations were of a substantial volume; leaving the relatively small operator in a virtually noncompetitive position.

The present invention obviates the disadvantages of prior forms of color monitoring devices while providing additional advantages in the form of greater expediency and accuracy in testing as well as reducing the overall cost of the system. Substantial benefits result in the form of a severe reduction in wastage or rejected copies, as well as the ability to exercise more exacting control over the acceptable copies to insure a more complete uniformity. The importance of this cannot be overstressed, since modern high speed presses turn out a substantial volume of printed material in a matter of a few minutes and thus failure to effect timely adjustments can result in considerable economic loss. In viewing this aspect, it is important to note that ink film thickness can vary due to improper adjustment in the fountains, or in offset or lithography printing, due to misadjustment of the flexible wiper blade which cooperates with the ink roller. In addition, slight changes in ink temperature, humidity and the like also serve to affect the ultimate thickness of the film applied to the sheet material and consequently, the final appearance of the printed material.

Accordingly, it becomes necessary to monitor the printed matter at regular intervals in order to insure a high quality finished product meeting or surpassing the customer's minimum requirements. Additional advantages of the present invention will become apparent from a perusal of the objects and description to follow.

It is a principal object of the present invention to provide a new and improved light density scanning assembly.

It is a further object of this invention to provide a new and improved light density scanning assembly having a series of adjustable stop means to facilitate rapid positioning of the reflector head together with memory control means which will be automatically adjusted with the selection of a new stop to provide an appropriate attenuation shift to conform to the color selection.

It is a further object of this invention to provide a light density scanning assembly having a reflector head mounted on a traversing carriage with memory control means to measure the ink film thickness of diverse repeating color patches, and present the results at the reflector head.

It is a further object of this invention to provide a light density scanning assembly of uncomplicated construction which will promote expedient color monitoring with a high degree of accuracy.

It is a still further object of this invention to provide a light density scanning assembly which due to its unique construction is simple to operate and therefore operable by those who are relatively unskilled.

Further and fuller objects will become readily apparent when reference is made to the accompanying drawings wherein:

FIG. 1 is a perspective view of an easel supporting a color test strip with the light density scanning assembly of the instant invention set up for operation;

FIG. 2 is an enlarged fragmentary perspective view of a carriage assembly having a reflector head positioned over the work surface;

FIG. 3 is an enlarged cross sectional view in elevation taken along the lines 3—3 of FIG. 1;

FIG. 4 is an enlarged cross sectional view in elevation taken along the lines 4—4 of FIG. 2;

FIG. 7 is an enlarged cross sectional view in elevation of the reflector head.

Figure 6:
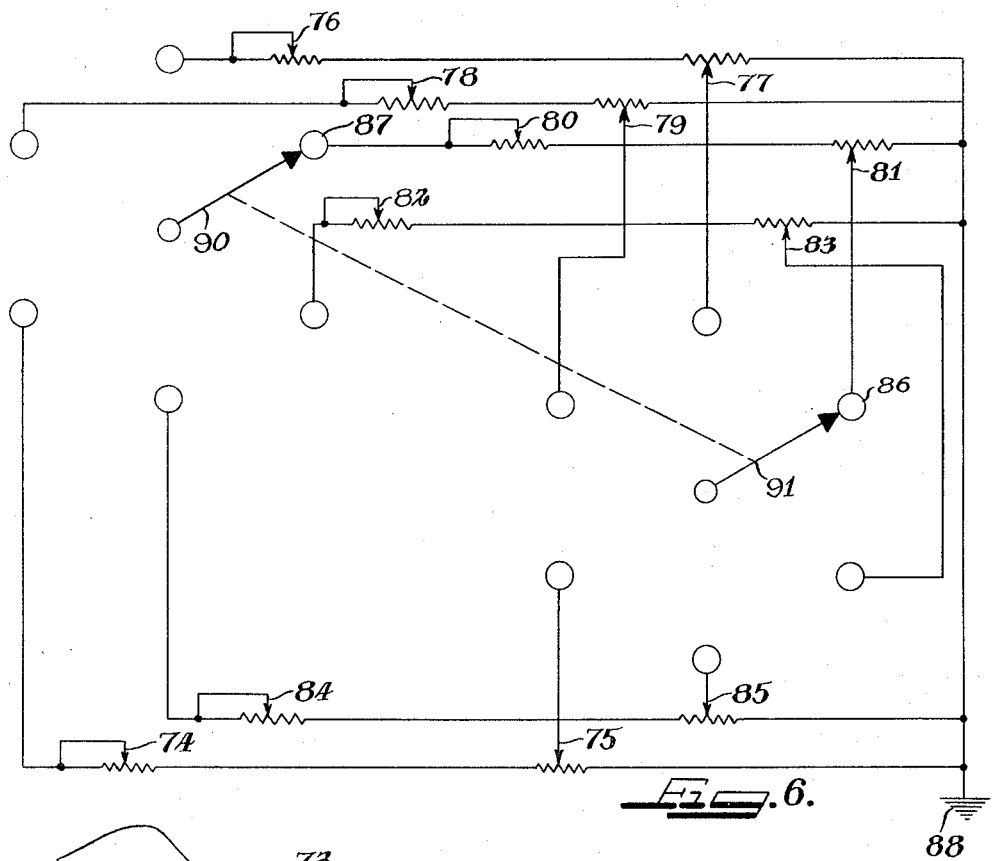
FIG. 6 is a schematic diagram of the attenuator circuit.

In FIGS. 1 and 2 of the drawings, reference character 10 indicates the light density scanning assembly of the present invention. A work surface 11, which may take the form of the easel shown or the equivalent, supports a track 12 adjacent one edge thereof. A stop member 13 and a memory control mounting case 1 are provided at opposite ends of the track 12 to support a rotatable index rod 15, for reasons to be described.

Reference character 16 indicates a carriage assembly movably mounted on the track 12 and supporting an arm member 17 on which is mounted a reflector head assembly 18 and direct reading meter 19. A suitable multi-wire conductor 22 leads from the reflector head assembly 18 and meter 19 to an A.C. amplifier 20 having calibration and range switch knobs 21 and 21' respectively. A constant voltage transformer 23 provides regulated constant voltage to the amplifier 20, and the reflector head 18 also. The amplifier 20 may be of any suitable form, however it is contemplated that an amplifier such as a Densichron Reflectometer manufactured by The Welch Scientific Company of Chicago, Illinois, would be preferable. A color test strip 24 is positioned on the work surface 11 having a series of repeating color patches adjacent one edge which are positioned beneath the reflector head 18.

As is more evident in FIG. 2, the carriage assembly 16 includes a support plate 25 having a depending lateral support plate 26 overlying the edge of the track 12. A hinge assembly 27 is mounted on the rearward edge of support plate 25 to pivotably carry the cantilevered arm 17. An adjustment means 28 controls the upward movement of the arm 17 as it attempts to pivot under the influence of a biasing spring (not shown) disposed between a support plate and the underside of the arm 17. The carriage assembly 16 is supported by antifriction means on the track 12, with the preferred embodiment employing roller assemblies, indicated generally at 29, to permit free rolling movement of the carriage assembly 16 along the track 12. Any suitable means may be utilized to hold the track to the carriage. For example, magnetic attraction could be one such means, or the lateral support plate 26 could extend beneath the work surface and be received in a suitable guide track on the underside of the work surface to maintain the carriage positioned over the track 12 at all times.

On the outer end of the cantilevered arm 17 a reflector head assembly 18 is provided, being adjustably held on the arm 17 by a mounting bracket 31 having an adjustable thumb screw 32 to maintain the reflector head assembly in the adjusted position with respect to the carriage assembly 16. A standard color test strip 33 is disposed beneath the reflector head lying flush against the work surface 11 with the repeating colors 34, 35, 36 and their counterparts indicated by prime reference characters facing upwardly.

The meter 19 is mounted directly above the reflector head 18 and may be of the center scale reading variety to permit direct reading when the color head is brought down into engagement with any one of the color patches shown. An adjustable stop means 37 is supported by the carriage support plate 25 and cooperates with a series of index marks or detents 38 disposed about the peripheral portion of the index rod 15. As will become apparent hereinafter, the adjustable stop means 37 cooperates with the index marks or detents 38 on the index rod 15 to stop the carriage at predetermined intervals so that the reflector head may be moved rapidly from one color test patch to its identical counterpart in the next repeating series.

In the enlarged view of FIG. 3, the right hand end portion of the index rod 15 is illustrated as being reduced in diameter as at 39 as it enters the memory control case 14. An indexing assembly is indicated generally at 40 including a plate member 41 having a raised boss portion 42 with a central bore 43 of sufficient diameter to receive the reduced portion 39 of the index rod 15. A pair of set screws 44 maintain the plate member 41 in rotatable engagement with the rod 15. Intermediate the plate member 41 and the wall of the control mounting case 14, a suitable antifriction bearing 45 may be provided to support the assembly as it enters the control box 14.

The reduced portion 39 of the index rod 16 emerges from the index assembly to enter a bearing member 46 mounted on a switch box 47 and passes therethrough to terminate in a coupling collar 48 which is supported for rotation by a bearing member 50. A set screw 49, pin, or the equivalent may be provided to join the coupling collar 48 at the end of the index rod 15 to insure co-rotation therebetween. The bearing 50 is supported by the outer wall member 51 of the control case 14 to provide good rotational support therefor. Also positioned within the control case 14 are a series of six dual potentiometers with two being indicated at 53 and 54.

The index assembly 40 includes an adjustable spring biased ball member 56 cooperating with a series of through holes or detents 55 angularly spaced in the rotatable plate member 41. A knob 57 having indicating means in the form of color marks 58, 59 and 60 or the like is mounted on the end portion of the coupling collar 48 outside the wall member 51. The angular spacing between the indicia 58, 59 and 60 and between the through holes or detent members 55 in the plate member 41 are identical so that when the ball member is positioned in one of the detents, such as the one indicated at 55, the associated indicating means will be at the top of the knob or adjacent an appropriate index mark. In a similar manner, the index marks or detents 38 are angularly spaced about the rod 15, an equal angular amount so that one row of index marks will always be disposed at the top peripheral portion of the rod 15, when the spring ball member 56 is received in one of the through holes or detents 55.

As is more evident in FIG. 4, the index marks 38 are formed in the peripheral portion of the rod 15 and are angularly and longitudinally spaced, forming a helical pattern about the rod. The adjustable stop means 37 for cooperation with the index marks 38, is illustrated in section and includes a threaded cylindrical member 61 having a central bore 62. At one end of the bore 62 a ball member 63 is positioned with the ends of the bore being rolled slightly inwardly to prevent escape of the ball 63 while permitting it to extend slightly therefrom. A biasing spring 64 abuts the ball member exerting force in a direction to attempt to force it out of the bore 62, with the opposite end of the spring 64 being in abutment with a knurled thumb screw 65 adapted to permit adjustment of the compression on the spring 64.

In addition to supporting the adjustable stop means 37, the support plate 25 is provided with a bore which cooperates with a guide pin 66 extending therethrough to preclude any lateral movement of the cantilevered arm 17. The arm 17 is allowed to pivot a slight amount vertically about the hinge pin 67 to maintain a reflector head assembly 18 slightly spaced from the work surface in the absence of external force. The reasons for this will become evident when the operation of the assembly is described.

Figure 5:
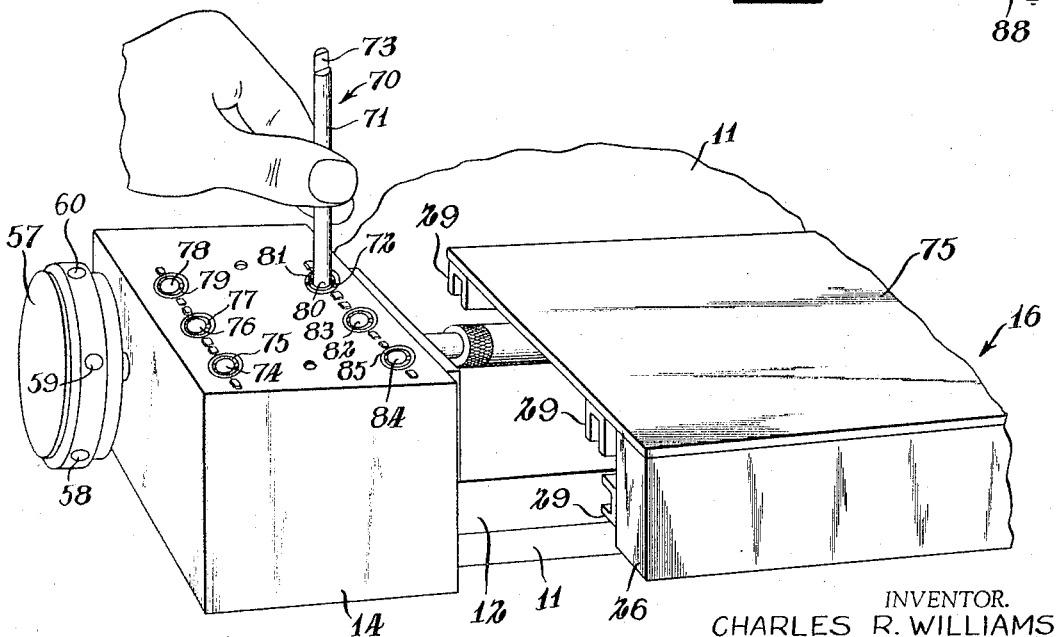
FIG. 5 is an enlarged perspective view of the carriage and memory control mounting case illustrating a tool in position to effect coarse and fine adjustment of the attenuators.

The enlarged perspective view of FIG. 5 illustrates the detail of the upper surface of the memory control mounting case or box 14. As noted previously, a series of variable resistances or potentiometers are provided within the memory control box, being electrically coupled to a switching mechanism housed within the switch box 47. Each of the individual resistances is variable to effect fine and coarse adjustment in calibration of the system. As illustrated in FIG. 5 a tool indicated at 70 includes a cylindrical body portion 71 having a cross pin 72 at one end thereof. At the opposite end a flat 73 is formed in order that the single tool 70 may be used to effect coarse and fine adjustment of the variable resistances. The potentiometer illustrated as being adjusted has a central bore 80 formed by an outer rotatable member 81 having cross slots at one end thereof to receive the cross pin 72. At the base of the bore 80, a cooperating portion of complementary configuration is provided to receive the flat 83 on the tool 70 with suitable sliders being mechanically coupled to each of the members 80 and 81 to permit adjustment of the resistance values as the tool 70 is rotated. The next adjacent potentiometer is also provided with a central bore 82 formed by an outer rotatable cylindrical member 83 having a cross slot to receive the cross pin 72 on the tool 70. The central bore 82 is formed in an identical manner to the bore 80 to facilitate attenuation adjustment. Similar adjustments are shown in pairs at 74 and 75, 76 and 77, etc. as indicated by consecutive reference numerals up through and including 84 and 85.

In the diagram of FIG. 6 the corresponding slide member operated by these adjustments is referred with a like but prime numeral to correspond with the adjustment bore and outer cylindrical member which is rotated by the cross pin. For example, when the cross pin 72 is inserted in the slots in the cylindrical member 81, the slide member 81' shown in the diagram of FIG. 6 can be varied from one end of the resistance to the other to change the value thereof. The slide member 81' is electrically connected to a terminal 86 while the counterpart potentiometer having slide member 80' which is adapted to be varied by the flat 73 on the tool 70, is serially arranged therewith and connected to a terminal 87. A pair of conducting switch blades 90 and 91 are illustrated as being ganged together by the conventional dotted lines, it being understood that the switch members will be mounted within the switch box 47 and rotatable angularly between the spaced terminals when the knob 57 is rotated. Suitable means such as a three wire jack and cooperating plug may be provided to connect the conducting portion of the switches 90 and 91 and the common ground 88 to the amplifier 20.

The adjustable stop on the index assembly 40 insures that the switch blades 90 and 91 will be in conducting relationship with the appropriate terminals to provide proper attenuation with the appropriate color indicia is at the top of the knob or adjacent and other suitable indexing means. At this time, one repeating series of the index marks or detents 38 will be disposed on the top of the rod 15 to insure alignment of the reflector head with the selected color. Six such terminals are shown for each of the switch blades 90 and 91 in FIG. 6 with a like number of index marks arranged angularly around the index rod 15. The index assembly 40 consisting of the angularly spaced holes in the plate member 41 and the cooperating ball member 56 include six settings with a like number of marks on the knob 57 also. It is obvious the number could be increased or decreased to meet the particular needs of the consumer, with six being chosen since instances requiring more than this number of colors are relatively rare.

The enlarged cross sectional view of FIG. 7 illustrates the internal construction of the reflector head assembly. The reflector head assembly includes a split housing 100 which is joined by any suitable means to allow access thereto for adjustment and/or replacement of components should such be necessary. A stepped bore 101 is provided having its central axis perpendicular to the underside 102 of the reflector head with a photocell 103 at the upper end thereof. Intermediate of the photocell 103 and the underside 102 of the reflector head is provided a lens system including a pair of double convex lenses 104 and 105 carried in a cylindrical sleeve member 106 and fastened in the bore by means of a set screw 107. Immediately above the lens system a filter and fixed aperture assembly 108 is mounted in a knob member 109 which rotates about a central pivot 110. A second fixed aperture 111 is positioned above the rotatable knob assembly with the entire system serving to distribute the proper color of light evenly over the cathode (not shown) of the photoelectric cell 103 at the upper end of the bore.

The fixed aperture and associated filter carried by the selector knob are rotatable into alignment with the axis of the bore 101 as individual colors are examined. The filters are primarily used to cancel color insofar as the photocell 103 is concerned and may be complementary or opposite in order that the photocell will only "see" shades of gray to which it is more sensitive than colors.

A second bore 112 is provided in the reflector head being of a stepped arrangement also and having the axis thereof at precisely 45° to the first bore 101. The upper end of the second bore diverges outwardly as at 113 to accommodate a light source 114 mounted in the reflector head by means of a mounting bracket 115 holding a socket member 116. At the lower end of the second bore a pair of double convex lenses 117 and 118 are arranged in spaced relation with respect to each other in a cylindrical case 119 which is held in the bore by means of a set screw 120 allowing removal to facilitate cleaning, adjustment and substitution.

On the underside 102 of the reflector head 18 is provided a series of spacer members 121 and 122 to prevent the underside from contacting the wet ink patches and also to insure that the light generated at the source 114 will strike the color patch at the precise distance therefrom, so as to be reflected up in the first bore 101. In this respect, it is particularly important that the light source be arranged at the exact angle of 45° with respect to the central axis of the first bore to obtain accurate and consistent results. The spacer members 121 and 122 assure that the color patch will be precisely at the apex of the angle formed between the light transmitted and the light reflected, without the reflector head coming into engagement with the color patch which could cause smearing and obviously affect the accuracy of the resulting test.

*Operation*

The operation of the light density scanning device of the present invention will now be explained. The surface containing the customer's standard or "pass copy" is placed on the work surface with the index knob appropriately set and a blue filter turned into alignment with the first bore to allow a reading to be taken. The reflector head is energized and positioned over an unprinted portion of the surface and calibration is effected so that a zero optical density or 100% reflectance is indicated on the direct reading meter, depending upon the chosen scale. It is contemplated that the meter which is mounted on the reflector head will be of the center scale zero variety having upper and lower limits of minus fifty (−50) and plus fifty (+50) on either side.

The reflector head may now be moved from the unprinted portion of the surface to the customer's standard color, the first of which for purposes of discussion, will be assumed to be a special shade of orange. Assume further that the meter reads 25% or 0.6 optical density which value becomes the customer's standard or pass copy value of color strength. The attenuators may be adjusted to obtain a mid-scale reading on the meter 19 by using the tool 70 for coarse and fine adjustments. The knob 57 is then rotated to the next color mark and the next color patch is treated in a similar manner, and so on until each standard color has been memorized. From this lighter and darker tolerances should now be set and a value given to them. For example, let us assume the light tolerance is 30% and a dark tolerance is 20%. The next procedure would be to bring the press sheet, which has been printed, to the work surface and position it in the manner shown in FIG. 1. A suitable alignment means may be provided to insure that the first color patch will be aligned with the first index mark on the index rod. The reflector head is adjusted on the arm to be aligned with the color patch and can be moved from one index mark to the other by merely overcoming the resistance to lateral movement caused by the ball member being received in the index mark. When moved to the color patch or like color in the next series transverse alignment is easily accomplished since the ball will drop into the index mark and increase resistance to lateral movement. Lateral alignment was previously effected by adjusting the reflector head 18 with the first color patch. The reflector head 18 may then be moved down by manual force to overlie the wet ink color patch with spacers 121 and 122 preventing direct contact therewith and the reading observed on the direct reading meter. If it is within the selected tolerance range no press adjustments are necessary. If the reflectance value is too high more ink should be applied and conversely if the reflectance value is too low less ink should be applied. The knob 57 is rotated and the second color in the series is checked and so on until all colors have been checked. Throughout this procedure the memory unit has "remembered" the proper attenuation factor for each color as the knob 57 is shifted from one color to another.

It is important that one realizes that the most value from the use of the scanning assembly shown can be obtained by taking wet ink readings as often and as quickly as possible in order to effect any necessary adjustment of the press. In addition, the light density assembly shown allows the measurement of the drydown characteristics of the ink to be controlled, and such technique has been found to be particularly useful in the printing industry.

The above example has been explained in connection with relatively few colors, however in modern day operations multiple colors are used, and therefore would be checked in the same manner as described above. It is to be appreciated that the memory control and index rod allow a shift from one color patch to the other by merely rotating the knob to the next stop, thus the pressman or his assistant may check all the patches of like colors completely across the entire width of the sheet and then move the knob to the next position to effect a complete test of the next color without further adjustment. For example, as many as six colors may be tested by the construction shown, which provides an adjustable electronic memory standard for each particular color, as well as an associated means to insure the accurate alignment of the reflector head with the repeating color patch as the width of the printed sheet is scanned.

More specifically, if cyan, magenta and yellow were being printed, along with black, red and green, the test strip would show all six colors in a line with a repeating series of identical color patches adjacent thereto, which would again be repeated completely across the printed sheet. All must be tested for density or ink film thickness completely across the printed sheet for two distinct reasons. These are: the paper can run darker in the middle or along the edges and therefore to maintain a uniformity of color within the tolerance limits, adjustments must be made in the ink film thickness $a$ for this inconsistency. This is better understood when it is considered that the light penetrates through the ink film to the paper or surface being printed and then is reflected back through the ink film. A certain portion of the light is absorbed by the ink film and this allows optical density or reflectance to be accurately measured. Obviously non-uniformity in the paper will result in slight differences which may be compensated for by the above described technique of fountain or wiper adjustment. Secondly, in offset and lithography type presses as well as automated presses, the wipers or ink fountain keys will require adjustment as the consistency of the ink varies due to any one of a number of factors such as temperature and humidity changes. Thus, at periodic intervals it is necessary to check the color printed against the customer's standard to maintain the uniformity within the prescribed tolerance limits. When one considers that it is necessary to perform this test at regular intervals, for example, every few hours, considerable time would be required if the electronic memory system were not available to memorize the proper attenuation factor for each of the standard colors. The transition from one color to the next may be quickly effected by rotation of the selector knob 57 on the memory control case and rotation of the filter selector knob on the reflector head if necessary. In addition, the index marks allow a rapid traverse from one test color patch to the other always insuring that the head will be aligned exactly over the succeeding color patch as it was over the previous for uniform results. Accordingly, more exacting standards can be maintained by the present invention along with a severe reduction in time required to effectively and accurately check the ink film thickness. The direct reading meter mounted on the head allows the test reading to be observed when the reflector head is manually brought down over the wet ink patch, and it is not necessary for the operator to shift his eyes from the test patch and reflector head to a remote meter as was done in the past. A further advantage connected with the present light density scanning assembly is the ability for different pressmen and their assistants to maintain uniform color standards on a multi shift basis, through the use of the present invention each will be able to "see" color as well as the other.

It will be obvious to those skilled in the art that certain departures can be made without departing from the scope of the present invention and therefore it is intended that any limitations imposed be within the spirit and scope of the appended claims.

I claim:

1. A light density scanner assembly comprising a work surface, a carriage assembly movable across said work surface, a series of spaced color test patches disposed on said work surface, said series of spaced color test patches being arranged in repeating patterns at spaced intervals, a reflector head mounted on said carriage assembly, said reflector head including a light source and photocell, said light source being arranged to project light on one of said color patches when said reflector head is moved into engagement with said work surface and said photocell being arranged relative to said light source to receive light reflected from said color patches, index rod means rotatably mounted on said work surface and having a series of rows of spaced index means thereon, the spacing on said index means corresponding to the spacing between said repeating color patches, means on said carriage to cooperate with said index means to provide a stop for said carriage to position said reflector head in alignment with one of said color patches in each of said series of spaced color test patches, amplifier means coupled to said photocell in said reflector head, and attenuator means electrically coupled to said amplifier means to provide proper attenuation to correspond with the color test patches, and means on said index rod means for automatically selecting a predetermined value of attenuation with each color test patch examined.

2. The light scanning assembly of claim 1 wherein a direct reading meter is shiftably carried by said carriage, said meter being electrically coupled to the output of said amplifier to permit direct reading, at the work surface.

3. The light density scanning assembly of claim 1 wherein the index means corresponding to each series of color test patches are angularly spaced each from the other about the periphery of said index rod means to allow selection of spaced indexed stops by rotation of said rod.

4. The light density scanning assembly of claim 3 wherein said attenuator means comprises a pair of ganged rotary switches having a conducting portion co-operating with a series of terminals arranged in a circular pattern, each of said terminals being connected to said amplifier through a variable resistance means, said terminals being angularly spaced each from the other a distance equal to the angular spacing between said index means on said index rod means to allow an attenuation shift with each index selection.

5. The light density scanning assembly of claim 1 further including means to rotate said index rod means and an index assembly coupled to said index rod means to stop each of said index means at a position facing away from said work surface.

6. A light density scanning assembly comprising a carriage assembly positioned for traversing movement along a work surface, a reflector head carried by said carriage assembly, said reflector head including a light source and a photocell positioned at an angle of less than 180° to each other, a series of spaced test patches disposed on said work surface to be measured by said reflector head, selective index means to stop said carriage assembly at predetermined spaced intervals corresponding to a selected series of test patches during said traversing movement, said selective index means comprising a plurality of different series of spaced interval stop means wherein each of said series corresponds to a selected series of test patches, and variable attenuator means to modify a signal received from said photocell in said reflector head, said variable attenuator means being coupled to said selective index means to stop said carriage thereby to automatically select the proper attenuation corresponding to a selected series of test patches simultaneously with each selection of spaced interval stop means.

7. The light density scanning assembly of claim 6 wherein said selective index means to stop said carriage assembly at spaced intervals includes an index rod having a series of repeating index marks angularly arranged around the periphery thereof and adjustably biased ball detent means on said carriage to cooperate with said marks.

8. The light density scanning assembly of claim 6 wherein said selective index means to stop said carriage assembly at spaced intervals includes an index rod rotatably mounted on said work surface, said index rod having a series of angularly and longitudinally spaced index marks thereon to form repeating patterns, and resiliently biased ball detent means on said carriage assembly adapted to cooperate with said index marks and said variable attenuator means includes a pair of rotary switches mechanically coupled to said rod cooperating with a series of switch terminals connected to variable resistances, each of said terminals being angularly spaced an amount equal to the angular spacing of said index mark whereby proper attenuation will be selected for each index mark on said rod.

9. The light density scanning assembly of claim 8 wherein said means is provided to rotate said index rod and automatically shift said variable attenuator means, said means having indicia means thereon to indicate the selected index mark and the selected resistor of the variable attenuator means.

10. The light density scanning assembly of claim 6 wherein an index assembly is provided to insure proper alignment of said selective index means to stop said carriage, said index assembly including a plate member rotatable with said selective means to stop said carriage, said plate member cooperating with stop means carried by said work surface to stop said selective means at predetermined angularly spaced intervals.

11. The light density scanning assembly of claim 6 wherein said photocell in said reflector head and said attenuator means are electrically coupled to an amplifier and further comprising meter means which are mounted on said carriage for direct reading thereof at the work surface, said meter means being electrically coupled to said amplifier to indicate changes in density of said patches.

References Cited

UNITED STATES PATENTS

| | | | |
|---|---|---|---|
| 2,019,764 | 11/1935 | Ogden | 88—24 |
| 2,716,352 | 8/1955 | Wilson | 74—527 X |
| 2,773,412 | 12/1956 | Huck | 88—14 |
| 2,871,719 | 2/1959 | Hooker | 74—527 X |
| 2,947,232 | 8/1960 | Armentrout et al. | 88—14 X |
| 2,981,148 | 4/1961 | Sausele | 88—24 |
| 3,019,693 | 2/1962 | Patnode | 88—14 |
| 3,053,181 | 9/1962 | Jorgensen | 88—14 X |
| 3,272,568 | 9/1966 | Koorneef et al. | |

JEWELL H. PEDERSEN, *Primary Examiner.*

W. A. SKLAR, *Assistant Examiner.*